United States Patent [19]

Fischer et al.

[11] 4,360,298
[45] Nov. 23, 1982

[54] TRAILER TRANSVERSE RACK ASSEMBLY FOR SHIPPING SHEETS

[75] Inventors: Wolfgang Fischer, Carlisle; William J. Brown, Lower Burrell, both of Pa.

[73] Assignee: PPG Industries, Inc., Pittsburgh, Pa.

[21] Appl. No.: 224,979

[22] Filed: Jan. 14, 1981

Related U.S. Application Data

[62] Division of Ser. No. 931,709, Aug. 7, 1978, Pat. No. 4,273,485.

[51] Int. Cl.³ .......................... B60P 7/10; B61D 3/16; B61D 45/00
[52] U.S. Cl. ...................................... 410/32; 206/451; 296/3; 410/34; 410/98
[58] Field of Search .............. 206/451; 296/3; 410/32, 410/34, 35, 38, 39, 40, 98

[56] References Cited

U.S. PATENT DOCUMENTS

| 619,237 | 2/1899 | Soule | 410/39 |
| 1,405,757 | 2/1922 | Clark | 410/32 |
| 2,156,876 | 5/1939 | Scull | 206/451 |
| 2,940,402 | 6/1960 | Hansen et al. | 410/40 |
| 3,193,122 | 7/1965 | Sauthoff | 410/40 |
| 3,596,755 | 8/1971 | Bundy | 410/40 X |
| 3,848,917 | 11/1974 | O'Neal | 296/3 |
| 3,878,942 | 4/1975 | Hansen et al. | 410/39 X |
| 3,893,705 | 7/1975 | Allen | 410/32 |
| 3,921,538 | 11/1975 | Bundy | 410/40 |
| 3,939,780 | 2/1976 | Bundy | 410/38 |
| 3,955,676 | 5/1976 | Hansen et al. | 410/40 X |
| 4,127,071 | 11/1978 | Thomaswick | 410/32 |
| 4,273,485 | 6/1981 | Fischer et al. | 410/32 X |

Primary Examiner—Robert B. Reeves
Assistant Examiner—Howard Beltran
Attorney, Agent, or Firm—Donald Carl Lepiane

[57] ABSTRACT

A sheet supporting rack has (1) a base including a pair of spaced elongated runners detachably secured on flatbed of a trailer; (2) a back support including a strut mounted on each of the runners; and (3) a front restraint including an upright slidably mounted on each of the runners. The sheets are mounted in a generally vertical position with an edge of the sheet supported on the base, and a major surface of the sheets supported by the back support. The uprights of the front restraint are slid and angled with respect to the runners to urge the sheets against the back support and to secure the uprights in position on the runners to prevent movement of the sheets during shipment thereof.

3 Claims, 13 Drawing Figures

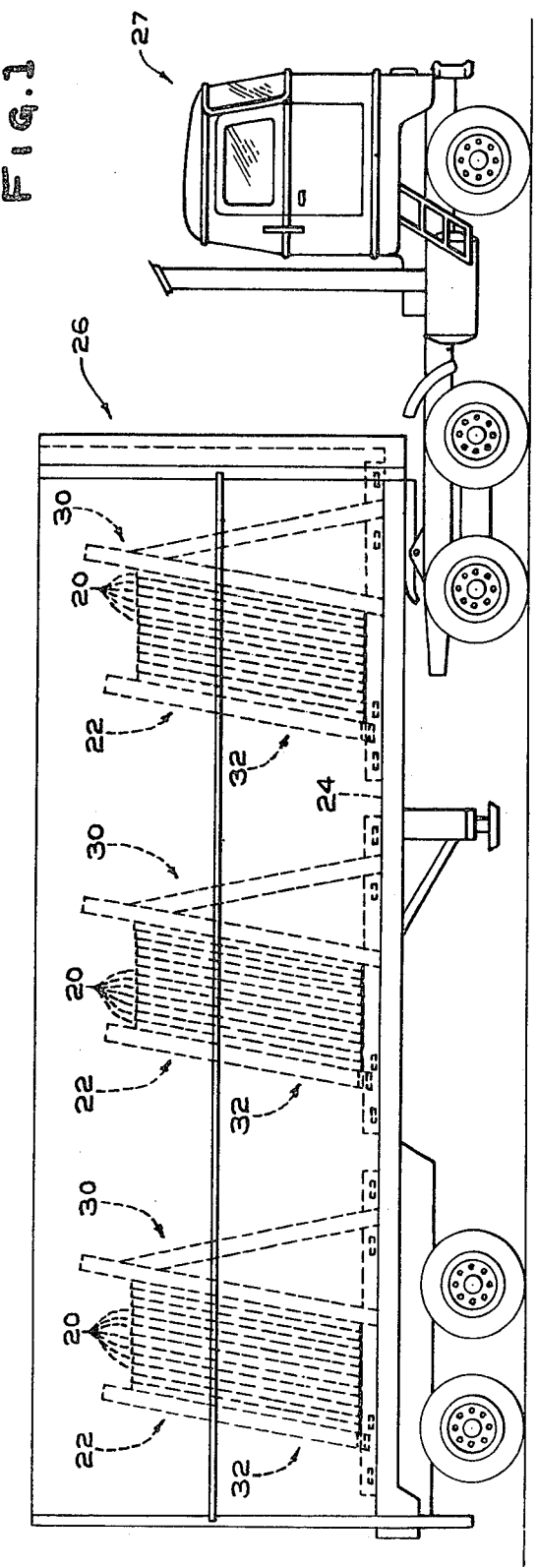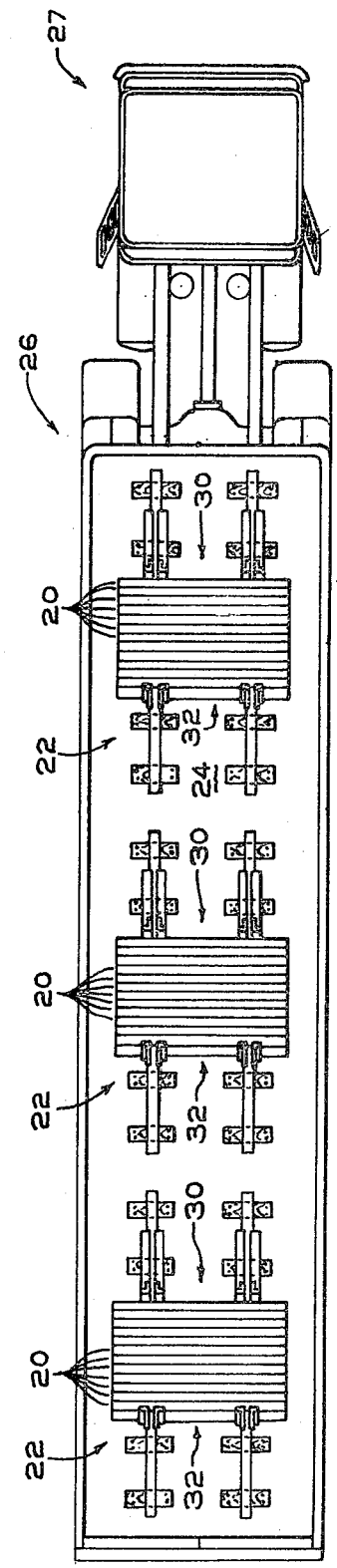

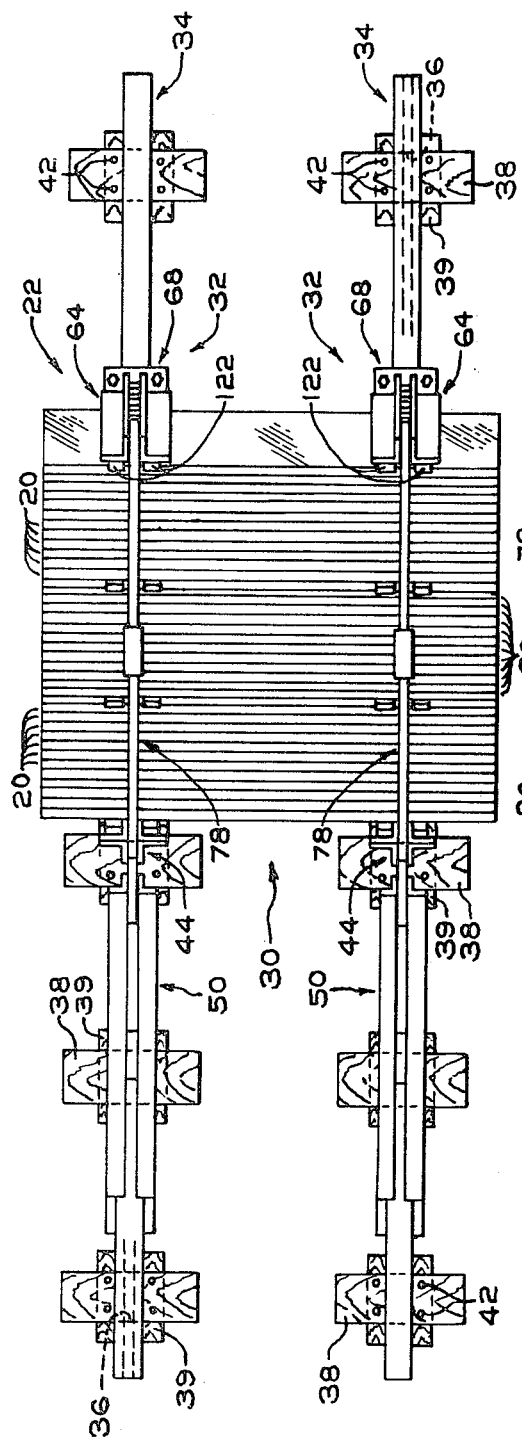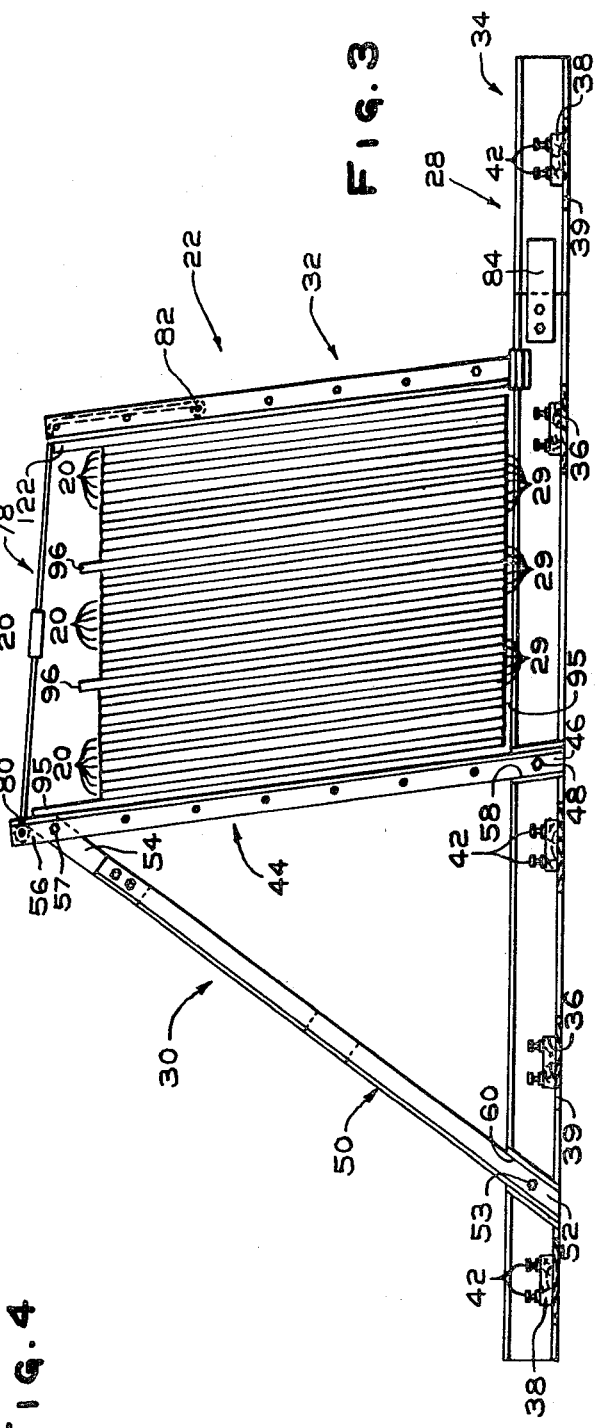

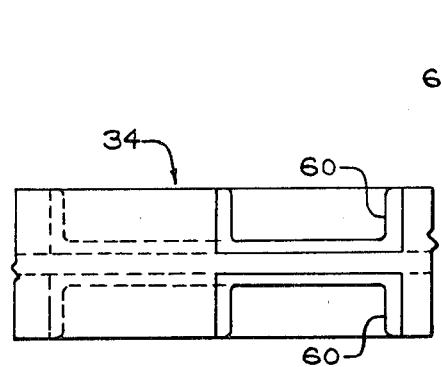
Fig. 8
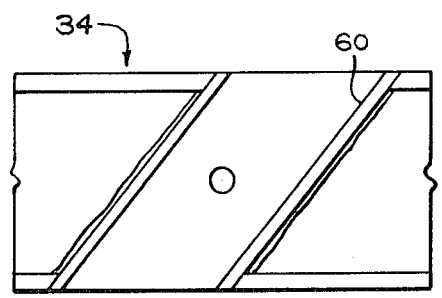
Fig. 7
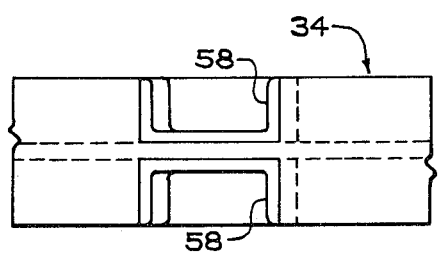
Fig. 6
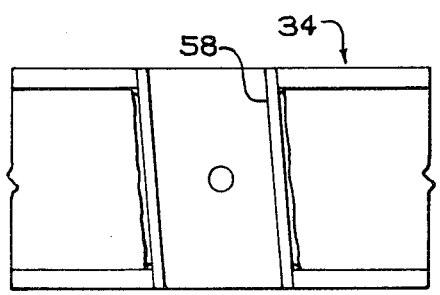
Fig. 5
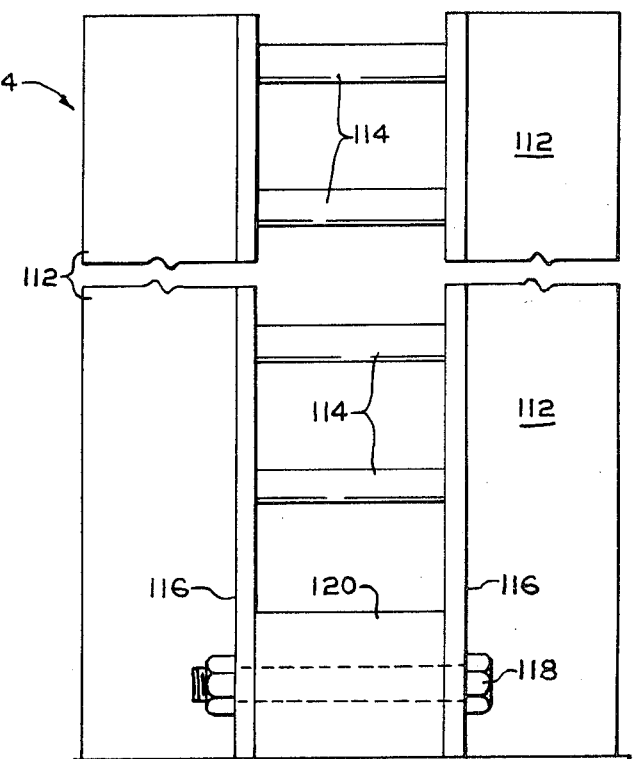
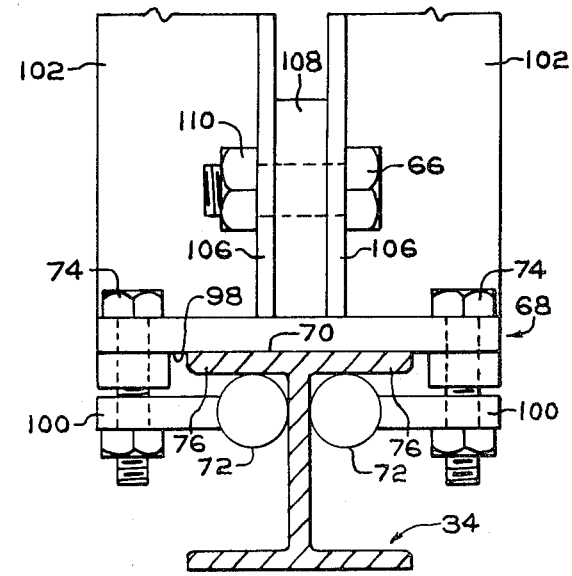
Fig. 13

TRAILER TRANSVERSE RACK ASSEMBLY FOR SHIPPING SHEETS

This is a division of application Ser. No. 931,709, filed Aug. 7, 1978, now U.S. Pat. No. 4,273,485.

BACKGROUND OF THE INVENTION

1. Field of the Invention

This invention relates to racks that are assembled on flatbeds of vehicles, e.g., open-top trailers, for shipping sheets, e.g., glass sheets.

2. Discussion of the Prior Art and Technical Problems

One mode of transporting glass sheets between locations is to load the sheets on racks mounted on flatbed of railcars or trailers. The racks used are preferably of the type than can be assembled for shipping the sheets and thereafter disassembled to maximize space in the trailer for carrying return lading. Prior art racks that are assembled and disassembled in trailers are taught in U.S. Pat. Nos. 3,596,755; 3,848,917; 3,878,942; 3,939,780; 3,955,676.

Although the racks taught in the above-identified patents are acceptable for their intended purposes, they have limitations. One of the limitations is that the sheets are mounted with the major surfaces of the sheets parallel to the walls of the trailer. A disadvantage with this arrangement is that the spaced distance between the prior art racks and adjacent walls of the trailers is narrow and therefore overhead equipment, e.g., a crane having a spreader bar and sling assembly are employed to clear the walls of the trailer and load the sheets on the racks. As can be appreciated, the loading and unloading of the sheets could be expedited if the sheets were loaded on the rack without the necessity of clearing the trailer walls and manipulating the sheets in a confined space, e.g., between the racks and adjacent trailer wall.

SUMMARY OF THE INVENTION

This invention relates to a collapsible rack for use in combination with a flatbed of a vehicle, e.g., an open top trailer. The collapsible rack includes a pair of spaced elongated runners detachably secured to the flatbed with their longitudinal axis generally parallel to the direction of vehicle travel. A back support mounts each of the runners for supporting the sheets to be shipped in a generally vertical position. Retaining facilities are provided for securing the sheets against the back support.

This invention also relates to a method of loading sheets on the flatbed of the trailer which includes the steps of detachably securing a pair of longitudinal runners in spaced relation to one another to the flatbed and mounting an upright on each of the runners to provide a backwall having its plane transverse to longitudinal axis of the runners and perpendicular to the direction of vehicle travel. The sheets are positioned on edge in a generally vertical position supported by the backwall after which the sheets are secured in position.

BRIEF DESCRIPTION OF THE DRAWING

FIG. 1 is a side elevated view of an open top trailer and truck arrangement having sheet supporting racks incorporating features of the invention;

FIG. 2 is a top view of the trailer and truck arrangement shown in FIG. 1;

FIG. 3 is a side elevated view of a rack incorporating features of the invention loaded with sheets;

FIG. 4 is a top view of the loaded rack shown in FIG. 3;

FIG. 5 is a side view of a section of a runner of the base showing a groove for limiting rotational movement of the vertical strut of the back support in accordance to the teachings of the invention;

FIG. 6 is a top view of the section of the runner shown in FIG. 5;

FIG. 7 is a side view of another section of the runner of the base showing a groove formed on one side of the runner for preventing rotational movement of the slanting strut of the back support in accordance to the teachings of the invention;

FIG. 8 is a top view of the section of the runner shown in FIG. 7;

FIG. 13 is a front view of the front restraint as viewed in FIG. 3 incorporating features of the invention.

DESCRIPTION OF THE INVENTION

Figure 10:
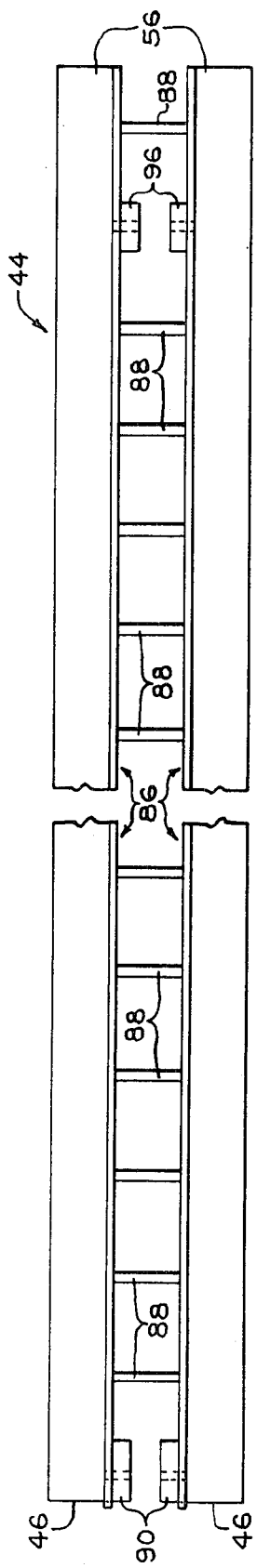
FIG. 10 is a top view of the vertical strut shown in FIG. 9.

With reference to FIGS. 1 and 2, sheets 20 are secured on racks 22 incorporating features of the invention mounted on flatbed 24 of trailer 26 powered by truck 27. As will be appreciated, the invention is not limited to the type of trailer that may be used and the invention may be practiced with open-top trailers, closed-top trailers, flatbeds of trucks and flatbeds of railcars. With continued reference to FIG. 1 and specific reference to FIGS. 3 and 4, each of the racks 22 are identical in construction and include a base 28 secured to the flatbed 24 for supporting the edges 29 of the sheets 20 (see FIG. 3); a back support 30 for supporting the sheets in a vertical position as shown in FIG. 3; and a front restraint system 32 for securing the sheets in position.

The base 28 may be built onto the flatbed during construction of the trailer or may be mounted on the flatbed of a constructed trailer. The manner of mounting the base 28 on a flatbed 24 is not limiting to the invention. For example and with specific reference to FIGS. 3 and 4, the base 28 may include longitudinal runners 34 each have a plurality of spaced passageways 36 formed therein for receiving plates 38. The plates 38 are leveled by shims 39 and detachably secured to the flatbed 24 in any conventional manner, e.g., double-headed nails 42 may be used to secure wooded plates 38 and shims 39.

With continued reference to FIGS. 3 and 4, the back support 30 includes a generally vertical rigid strut 44 having one end 46 detachably secured to its respective runner 34 by a nut and bolt assembly 48, and a slanting rigid strut 50 having end 52 detachably secured to its respective runner 34 by nut and bolt assembly 53. The end 54 of the strut 50 is detachably secured to end 56 of the vertical strut 44 by nut and bolt assembly 57. The ends 46 and 52 of the struts 44 and 50, respectively, are secured to their respective runner 28 to prevent collapsing of the back support 30 during deceleration of the truck 27. This may be accomplished by providing grooves 58 and 60 (see FIGS. 3 and 5-8) in the runners 34 for receiving the ends 46 and 52 of the struts 44 and 50.

Although not limiting the invention, it is recommended that the plane of the back support 30 and the plane of the base 28 subtend an oblique angle for stacking stability during loading and unloading of the sheets. Further, it is recommended that the vertical struts 44 have a wide sheet engaging surface to eliminate point contact forces acting on the supported sheets. Still further, it is recommended that the longitudinal axis of the runners 34 be generally parallel to the longitudinal axis of the flatbed 24 e.g., parallel to the direction of trailer travel. With this arrangement, the sheets may be loaded on the racks 20 by a vehicle, e.g., a fork lift truck (not shown), moving onto the flatbed 24 of the trailer 26 and/or by a sling and spreader bar assembly (not shown).

With reference to FIGS. 3, 4 and 13, the front restraint 32 includes a pair of vertical uprights 64, each pivotally mounted at 66 to platform 68 (clearly shown in FIG. 13). With specific reference to FIG. 13, the platform 68 is slidably mounted on upper surface 70 of its respective runner, e.g., I beam 34. A pair of fingers 72-72 are mounted to the platform 68 by a nut and bolt assemblies 74 to provide a dog clutch assembly for engaging surface 76 of the runner 34 as shown in FIG. 13. In use and with continued reference to FIG. 13, the platform 68 is slid along its respective runner against the outermost stacked sheets after which the nut and bolt assemblies 74 are lightened to urge fingers 72-72 against the surface 76 of its respective runner 34. The upright 64 is thereafter urged against the outermost stacked sheet i.e., angled with respect to the runner, to urge (1) the sheets toward the back support 30 and (2) the fingers 72-72 into the surface 76 to secure the uprights 68 in position. With reference to FIG. 3, a ratchet and strap assembly 78 has one end 80 engaging the back support 30 and the other end 82 engaging the front restraint 32 to (1) maintain the upright 64 in a locked position and (2) to urge the sheets 20 together between the back support 30 and the front restraint 32.

As can now be appreciated, the invention is not limited to the types of sheets that may be loaded on the racks of the instant invention. For example, the sheets may be glass sheets, wooden sheets or metal sheets, or the sheets may be multiple glazed units. If the sheets to be shipped are easily marred, for example glass sheets, it is recommended that surfaces contacting the glass sheets be covered with a nonmarring cushioning material, e.g., rubber, cardboard and/or insulation board. Further it is recommended that spacers be used between plurality of sheets to facilitate handling the sheets during loading and unloading. Further, as can be appreciated, the invention is not limited to the actual construction or material of the rack components. However, it is recommended that the material be lightweight to reduce the weight of the rack thereby increasing allowable shipping load and that the material used provides a rack that is structurally stable.

DETAILED DESCRIPTION OF THE INVENTION

Referring to FIGS. 1 and 2, the invention is used for shipping glass sheets 20 on racks 22 incorporating features of the invention mounted on flatbed 24 of open-top trailer 26 of the type used in the art.

With reference to FIGS. 3 and 4, the racks 22 are identical in construction and each include a base 28 made from a pair of longitudinal runners 34 on a center to center spacing of about 54 inches (1.371 meters). Each of the runners 34 are made of two aluminum 6 inch 5.4 pound I beams. The main I beam is about 120 inches (3 meters) long and extension I beam is about 44 inches (1.1 meters) long. The extension I beam is joined to the main I beam by a pair of about ½ inch (1.27 centimeter) thick, 12 inch (0.3 meter) long and 4 inches (0.1 meter) wide aluminum plates 84 (one only shown in FIG. 3) in any conventional manner. With continued reference to FIG. 3, five passageways 36 are formed in the web of the I beam runners 34. Each of the passageways 36 have a height of about 2 inches (5.08 centimeters) and a length of about 6 inches (15.24 centimeters) for receiving a wooded board 38 about 2 inches (5.08 centimeters) high, 6 inches (15.24 centimeters) wide, and 18 inches (0.45 meter) long. The passageways 36 as viewed in FIG. 3 are on a center to right end of beam spacing of about 29 inches (0.731 meters), 59 inches (1.498 meters), 107 inches (2.176 meters), 131 inches (3.236 meters), 153 inches (3.886 meters). The boards 38 passing through the passageway 36 of the I beam runners 34 are leveled by wooden shims 39 and nailed to the flatbed 24 by doubleheaded nails 42 as shown in FIGS. 2 and 3 with the longitudinal axis of the runners 34 parallel to the longitudinal axis of the flatbed 24, e.g., parallel to the direction of travel.

In the following discussion, unless indicated otherwise, the angle members of back support 30 and front restraint 32 are made of ¼ inch (0.64 centimeter) thick aluminum angle members having a short leg about 3 inches (7.62 centimeters) wide and a long leg about 4 inches (10.16 centimeters) wide.

Figure 9:
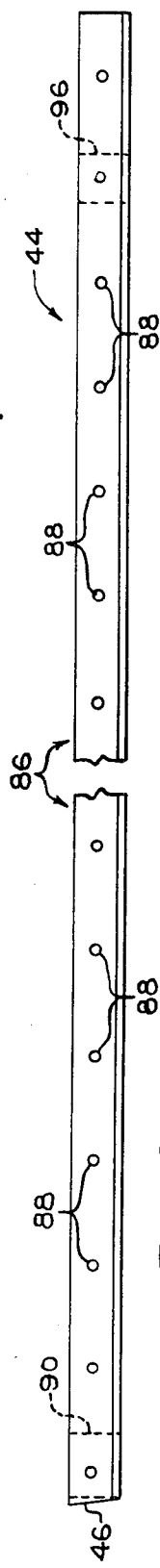
FIG. 9 is a side view as viewed in FIG. 3 of the vertical strut of the back support.

Referring to FIG. 3, the back support 30 includes a vertical rigid strut 44 and a slanting rigid strut 50 detachably secured to each runner 34 by a nut and bolt assembly 48 and 53 respectively. With reference to FIGS. 9 and 10, the vertical strut 44 is made of a pair of angle members 86 having a length of about 76¼ inches (1.937 meters). The short leg of the members 86 are spaced about 3 inches (7.62 centimeters) apart by about 10 spaced 3½ inch (8.9 centimeters) long, ⅝ inches (1.6 centimeters) diameter pins 88 as shown in FIG. 10. A pair of aluminum shims 90, each about 1 inch (2.54 centimeters) thick, 3 inches (7.62 centimeters) wide and 4 inches (10.16 centimeters) long are mounted on the short legs of the angle members 86 adjacent end 46 to reduce the spacing between the members 86 to about 1 inch (2.54 centimeters) to provide a snug fit when the end 46 of the strut 44 is inserted in grooves 58 (see FIGS. 5 and 6) of the runners 4. The grooves 58 shown in FIGS. 5 and 6 are each made of 4 inch U-shaped 2.5 pound aluminum section secured to the I beams 34 to provide a 1 inch (2.54 centimeter) thick wall between the grooves 58 and about 105° angle subtend by the plane of the supporting surface of the strut 44 and the plane of the base 28 for packing stability.

Figure 12:
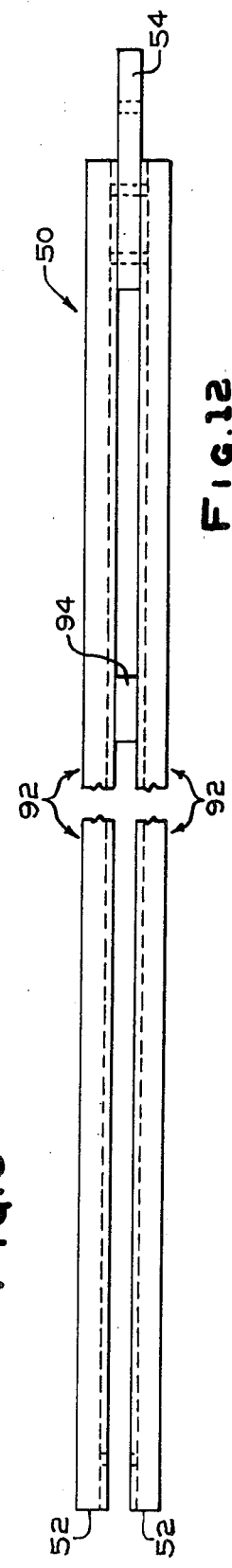
FIG. 12 is a top view of the slanting strut shown in FIG. 11.
Figure 11:
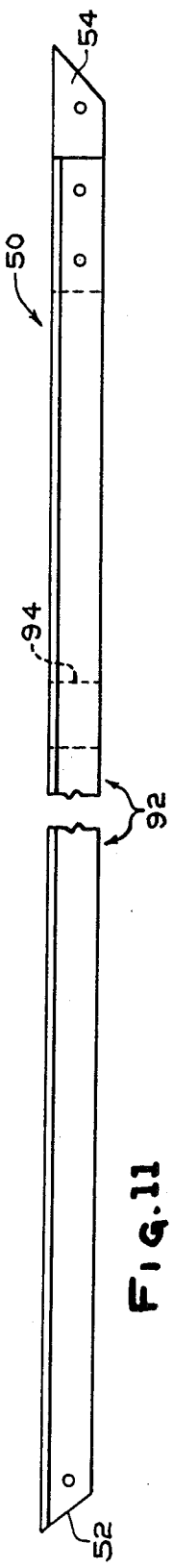
FIG. 11 is a side view as viewed in FIG. 3 of the slanting strut of the back support.

The slanting strut 50, as shown in FIGS. 11 and 12, includes a pair of angle members 92 having their short legs spaced apart by a 1 inch (2.54 centimeters) thick, 3 inches (7.62 centimeters) wide and 4 inches (10.16 centimeters) long aluminum spacer 94. End 52 of the strut 50 is mounted in grooves 60 shown in FIGS. 7 and 8 formed in a similar manner as grooves 58 show in FIGS. 5 and 6. The end 52 of the strut 50 is detachably secured by bolt and nut assembly 52 (see FIG. 3) with the plane of the strut 50 and the plane of the base 28 subtending an angle of about 51°. An aluminum plate about 3 inches (7.62 centimeters) wide, 1 inch (2.54 centimeters) thick and 15¾ inches (0.4 meters) long is secured between the members 92 to provide an end 54 which is insertable between spacers 96 at end 56 of the vertical strut 44 (see FIG. 10) and detachably secured together by nut and bolt assembly 57 as shown in FIG. 3.

The supporting surface of the back support 30 and the base 28 are provided with 1 inch (2.54 centimeters) thick insulation board 95. Glass sheets ¼ inch (0.64 centimeters) thick, and 64 inch (1.6 meters) square have their end 29 supported by the base 28 and held in a generally vertical position by the back support 30 as shown in FIG. 3. The glass sheets are separated in groups of 25 by spacers 96.

With reference to FIGS. 3 and 4 and with specific reference to FIG. 13, front restraint 32 includes a pair of uprights 64 pivotally mounted at 66 to a 1 inch (2.54 centimeters) thick steel platform 68 having a width of about 4½ inches (11.4 centimeters) and a length of about 5¾ inches (14.6 centimeters) with a ½ inch deep, 5¾ inches (14.6 centimeters) long guideway 98 for maintaining the platform 68 on surface 70 of the runners 34. A pair of fingers 72 each made of 1 inch (2.54 centimeter) diameter steel rod, 4½ inches (11.4 centimeters) long and each welded to a 1¾ inches (4.445 centimeters) wide, 4½ inches (11.4 centimeters) long plate member 100 are secured to the platform 68 by nut and bolt assembly 74. A pair of angle members 102, 18 inches (2.3 meters) long and spaced 1 inch (2.54 centimeters) apart have their ends 103 joined to a ¼ inch (0.64 centimeter) thick steel member 104 having a length of about 12 inches (0.3 meters) and a width of about 3 inches (7.62 centimeters). Ends 106 of the angle members 102 are joined by a nut and bolt assembly 110 to steel tab 108 mounted to the platform 68.

Angle members 112 about 54 inches (1.3 meters) long and spaced 3 inch (7.62 centimeters) apart by pins 114 similar to the pins 88 (see FIG. 10) have their end 116 joined by nut and bolt assembly 118 to tab 120 of the member 104. The surface of the front restraint 64 engaging the outermost sheet has a 1 inch (2.54 centimeters) insulation board 122 as shown in FIG. 3.

The upright 64 of the front restraint 32 are slid by way of the platform 68 along its respective runner 34 to urge the insulation board 122 against the outermost sheet. The nut and bolt assemblies 74 are tightened after which the uprights 64 are urged against the outermost sheet and held in position by ratchet and strap assembly 78. The assembly 78 has end 82 secured to a pin 114 of the uprights of the front restraint 32 and the other end 80 of the assembly 78 secured to a pin 88 of the vertical strut 44 of the back support 30.

Additional racks may be assembled and loaded as previously discussed. The glass sheets are generally unloaded from the racks 22 in the reverse order in which they were loaded. The racks 22 may be disassembled in the reverse order in which they were assembled.

As can be appreciated, the above example is presented for illustration purposes only and is not limiting to the invention.

What is claimed is:

1. A method of assembling a rack on a flatbed of a vehicle for supporting glass sheets during transit, the flatbed having a longitudinal axis extending in the direction of vehicle travel, comprising the steps of:

detachably securing a pair of longitudinal runners in spaced relation to one another on the flatbed of the vehicle with their longitudinal axis generally parallel to one another and the longitudinal axis of the flatbed;

mounting a back support on the runners to define a tilted supporting plane with the supporting plane transverse to the longitudinal axis of the runners to provide the rack;

positioning peripheral edge portions of each glass sheet on the runners with major surface of each sheet generally parallel to the supporting plane to support the sheets in a generally upright position by the back support; and securing the sheets in position on the rack.

2. The method as set forth in claim 1 further including the step of:

providing a compressible material on sheet contacting surface portions of the back support and runners.

3. The method as set forth in claim 1 wherein said detachably securing step includes the steps of:

providing on each of the runners an upright mounted on a platform and forming a dog and clutch assembly with the runner;

angling the upright to engage the dog and clutch assembly; and securing the upright in position.

* * * * *